(12) United States Patent
Meng et al.

(10) Patent No.: US 10,084,706 B2
(45) Date of Patent: Sep. 25, 2018

(54) METHOD AND DEVICE FOR PROCESSING SERVICE FUNCTION CHAINING

(71) Applicant: ZTE Corporation, Shenzhen (CN)

(72) Inventors: Wei Meng, Shenzhen (CN); Cui Wang, Shenzhen (CN); Bo Wu, Shenzhen (CN); Liang Fan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 177 days.

(21) Appl. No.: 15/124,196

(22) PCT Filed: Jul. 23, 2014

(86) PCT No.: PCT/CN2014/082846
§ 371 (c)(1),
(2) Date: Sep. 7, 2016

(87) PCT Pub. No.: WO2015/143802
PCT Pub. Date: Oct. 1, 2015

(65) Prior Publication Data
US 2017/0019334 A1 Jan. 19, 2017

(30) Foreign Application Priority Data
Mar. 27, 2014 (CN) .......................... 2014 1 0121367

(51) Int. Cl.
*H04L 12/741* (2013.01)
*H04L 12/64* (2006.01)
(Continued)

(52) U.S. Cl.
CPC ........ *H04L 45/745* (2013.01); *H04L 12/6418* (2013.01); *H04L 45/306* (2013.01);
(Continued)

(58) Field of Classification Search
CPC ... H04L 12/6418; H04L 45/306; H04L 45/38; H04L 45/54; H04L 45/64; H04L 45/745; H04L 61/2015; H04L 61/256
See application file for complete search history.

(56) References Cited

U.S. PATENT DOCUMENTS

| 6,724,728 B1 * | 4/2004 | Manchester ........ H04L 12/5601 370/236.1 |
| 2015/0215172 A1 * | 7/2015 | Kumar ................ H04L 41/5041 709/223 |

(Continued)

FOREIGN PATENT DOCUMENTS

| CN | 101047636 A | 10/2007 |
| CN | 101442493 A | 5/2009 |
| CN | 101795223 A | 8/2010 |

OTHER PUBLICATIONS

International Search Report fro corresponding application PCT/CN2014/082846 filed on Jul. 23, 2014; dated Jan. 8, 2015.

*Primary Examiner* — Mohamed Kamara
(74) *Attorney, Agent, or Firm* — Cantor Colburn LLP

(57) ABSTRACT

The disclosure discloses a method and device for processing a Service Function Chaining (SFC). The method includes that: the SFC receives a message sent from forwarding equipment; the SFC generates a forwarding table corresponding to the message; and under a condition that a preset state of a forwarding table sending switch is on, the SFC sends the forwarding table to the forwarding equipment to make the forwarding equipment forward the message according to the forwarding table when receiving the message, wherein the forwarding table sending switch is used for indicating the SFC whether to send the forwarding table to the forwarding equipment or not. By the disclosure, an effect of increasing a success rate of data forwarding of the SFC is achieved.

17 Claims, 7 Drawing Sheets

(51) Int. Cl.
*H04L 12/715* (2013.01)
*H04L 29/12* (2006.01)
*H04L 12/725* (2013.01)
*H04L 12/721* (2013.01)

(52) U.S. Cl.
CPC .............. *H04L 45/54* (2013.01); *H04L 45/64* (2013.01); *H04L 61/2015* (2013.01); *H04L 61/256* (2013.01); *H04L 45/38* (2013.01)

(56) References Cited

U.S. PATENT DOCUMENTS

| | | | |
|---|---|---|---|
| 2016/0080253 A1* | 3/2016 | Wang | H04L 12/6418 370/392 |
| 2016/0134531 A1* | 5/2016 | Assarpour | H04L 45/74 370/392 |
| 2017/0099194 A1* | 4/2017 | Wei | H04L 41/50 |
| 2017/0302623 A1* | 10/2017 | Bifulco | H04L 47/2441 |

\* cited by examiner

METHOD AND DEVICE FOR PROCESSING SERVICE FUNCTION CHAINING

TECHNICAL FIELD

The disclosure relates to the communications field, and in particular to a method and device for processing a Service Function Chaining (SFC).

BACKGROUND

An SFC is a network technology which is being researched and standardized at present. From development of a data center network to an overlay network, a network edge becomes a demarcation point between a virtual network and a physical network, wherein the network edge is a server or The Onion Router (ToR), and may also be a gateway. However, an overlay technology does not solve all problems, there is still so much middleware in a data center, such as a firewall/load balancer, processing of all the equipment is implemented on a basis of user services, and it is obviously inappropriate to cross the equipment through tunnels.

Such a deployment model of the data center requires that a virtual firewall/load balancer may be freely deployed in a network and is namely unrelated to a network topology. As a result, a new problem arises: how to flexibly process traffic through the virtual firewall/load balancer? Then, a novel middleware such as the virtual firewall/load balancer is produced, and the virtual firewall/load balancer is deployed on an edge of a network and may be implemented by a standard server.

A service processing function such as a virtual firewall/load balancer/gateway is called a Service Function (SF), and traffic is processed by a series of SFs to form SFC. FIG. 1 is a schematic diagram of an SFC according to the related art, and as shown in FIG. 1, full line/dotted line represents two service chains.

In the related art, a present SFC framework may substantially include the following components:

(1) service overlay, i.e. an overlay technology for communication of each network edge node;

(2) Generic Service Control Plane (GSCP), i.e. a controller forming the SFC;

(3) service classification, that is, it is necessary to perform flow identification and then perform specific SFC processing on a specific flow; and (4) dataplane metadata, which is a major characteristic, the metadata allowing each edge service processing node to exchange information with one another to achieve a certain service processing purpose.

From the above, the SFC may separate an SF and a forwarding function of network equipment, thereby implementing independent operation and processing of the SF and improving forwarding performance of the network equipment.

For an existing SFC technology, a session and forwarding table generated for a service are usually created and stored on the SFC, and it is not clearly defined that the created forwarding table is required to be forwarded to forwarding equipment such as a router, a switch, a hardware firewall and Customer Premise Equipment (CPE).

However, in some specific scenarios, SFC data forwarding in the related art may cause a data traffic forwarding failure.

For example, FIG. 2 is an application schematic diagram of CPE in an SFC scenario according to the related art. As shown in FIG. 2, a group of user terminals directly access the CPE, a service classification component is integrated in the CPE, and a service to be processed by each piece of CPE is required to be uploaded to a group of SFC for processing. For a first outbound data packet, i.e. a first message of a certain data connection from an intranet (intranet user) to an extranet, each piece of CPE performs service classification processing on the service, loads the service in the SFC for processing and forwards the service to the extranet, and at this moment, the SFC creates a related session, i.e. a forwarding table. When only the CPE integrates the service classification component of the SFC and network equipment of the extranet does not implement the SFC, in such a scenario, inbound traffic (i.e. traffic from the extranet to the intranet (the intranet user)) is required to be forwarded to the CPE at first in the related art, and then the CPE sends the service to the SFC for service processing after processing the service through the service classification component. Since multiple pieces of CPE are managed by the SFC, the SFC is not directly connected with the user terminals, and it is impossible for the SFC to directly send the processed message to the user terminals.

For a problem that the SFC does not send a created forwarding table to forwarding equipment to cause a data traffic forwarding failure in the related art, there is yet no effective solution.

SUMMARY

The embodiments of disclosure provide a method and device for processing an SFC, so as to at least solve the abovementioned problem.

According to one embodiment of the disclosure, a method for processing an SFC is provided, which may include that: receiving, by the SFC, a message sent from forwarding equipment; generating, by the SFC, a forwarding table corresponding to the message; and under a condition that a preset state of a forwarding table sending switch is on, sending, by the SFC, the forwarding table to the forwarding equipment to make the forwarding equipment forward the message according to the forwarding table when receiving the message, wherein the forwarding table sending switch is used for indicating the SFC whether to send the forwarding table to the forwarding equipment or not.

In an example embodiment, a message forwarding manner corresponding to the forwarding table sending switch includes: forwarding through the forwarding equipment, wherein forwarding through the forwarding equipment refers to that the SFC sends the forwarding table to the forwarding equipment after generating the forwarding table, the forwarding equipment searches for whether there is a forwarding table corresponding to the message or not when the message entering the forwarding equipment, the forwarding equipment forwards the message according to the searched forwarding table when there is the searched forwarding table corresponding to the message, and when there is not the searched forwarding table corresponding to the message, the forwarding equipment sends the message to the SFC, and the SFC creates the forwarding table for the message and sends the created forwarding table to the forwarding equipment.

In an example embodiment, a message forwarding manner corresponding to the forwarding table sending switch includes: forwarding through the SFC, wherein forwarding through the SFC refers to that the SFC does not send the forwarding table to the forwarding equipment after generating the forwarding table, the forwarding equipment sends the message to the SFC when the message enters the forwarding equipment, and the SFC creates the forwarding table for the message and forwards the message according to the created forwarding table.

In an example embodiment, information used for generating the forwarding table includes one of: a routing table, a Network Address Translation (NAT) mapping entry and an openflow table.

In an example embodiment, an application scenario of the method includes: Service Function (SF)-based NAT, a Dynamic Host Configuration Protocol (DHCP) and Internet Protocol Security (IPsec).

According to another embodiment of the disclosure, a device for processing an SFC is provided, which may include: a receiving component, configured to receive a message sent from forwarding equipment; a generation component, configured to generate a forwarding table corresponding to the message; and a sending component, configured to, under a condition that a preset state of a forwarding table sending switch is on, send the forwarding table to the forwarding equipment to make the forwarding equipment forward the message according to the forwarding table when receiving the message, wherein the forwarding table sending switch is used for indicating the SFC whether to send the forwarding table to the forwarding equipment or not.

In an example embodiment, information used for generating the forwarding table includes one of: a routing table, a Network Address Translation (NAT) mapping entry and an openflow table.

According to another embodiment of the disclosure, another method for processing an SFC is provided, which may include that: receiving, by SFC, a message sent from forwarding equipment, wherein the message carries a network service header; and under a condition that a preset loopback mark in the network service header has been set, creating, by the SFC, a forwarding table corresponding to the message, performing, by the SFC, processing operation on the message according to the forwarding table and sending, by the SFC, the processed message to the forwarding equipment for message forwarding.

In an example embodiment, the processing operation includes at least one of: encapsulation/decapsulation and message field processing.

In an example embodiment, an application scenario of the method includes: Service Function (SF)-based Network Address Translation (NAT), a Dynamic Host Configuration Protocol (DHCP) and Internet Protocol Security (IPsec).

According to another embodiment of the disclosure, another device for processing an SFC is provided, which may include: a receiving component, configured to receive a message sent from forwarding equipment, wherein the message carries a network service header; and a processing component, configured for SFC to, under a condition that a preset loopback mark in the network service header has been set, create a forwarding table corresponding to the message, perform processing operation on the message according to the forwarding table and send the processed message to the forwarding equipment for message forwarding.

In an example embodiment, processing operation includes at least one of: encapsulation/decapsulation and message field processing.

According to the embodiments of the disclosure, a manner of additionally setting the forwarding table sending switch or the loopback mark is adopted, so that the problem that the SFC does not send the created forwarding table to the forwarding equipment to cause a data traffic forwarding failure in the related technology is solved, and the effects of increasing a success rate of data forwarding of the SFC and improving data forwarding performance of network equipment are further achieved.

BRIEF DESCRIPTION OF THE DRAWINGS

The drawings described here are adopted to provide further understanding of the disclosure, and form a part of the disclosure. Schematic embodiments of the disclosure and descriptions thereof are adopted to explain the disclosure and not intended to form improper limits to the disclosure. In the drawings.

DETAILED DESCRIPTION

The disclosure will be described below with reference to the drawings and embodiments in detail. It needs to be noted that the embodiments in the disclosure and characteristics in the embodiments may be combined under the condition of no conflicts.

Figure 1:
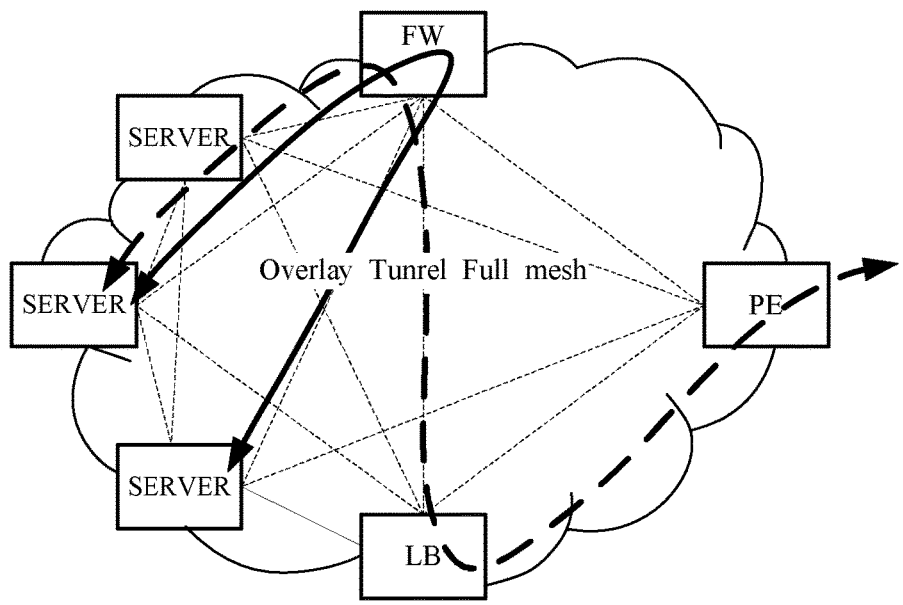
FIG. 1 is a schematic diagram of an SFC according to the related art.
Figure 2:
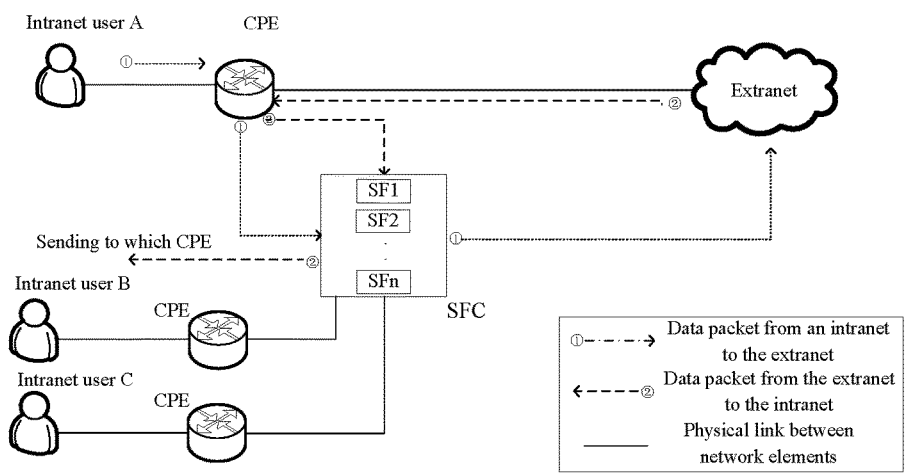
FIG. 2 is an application schematic diagram of CPE in an SFC scenario according to the related art.
Figure 3:
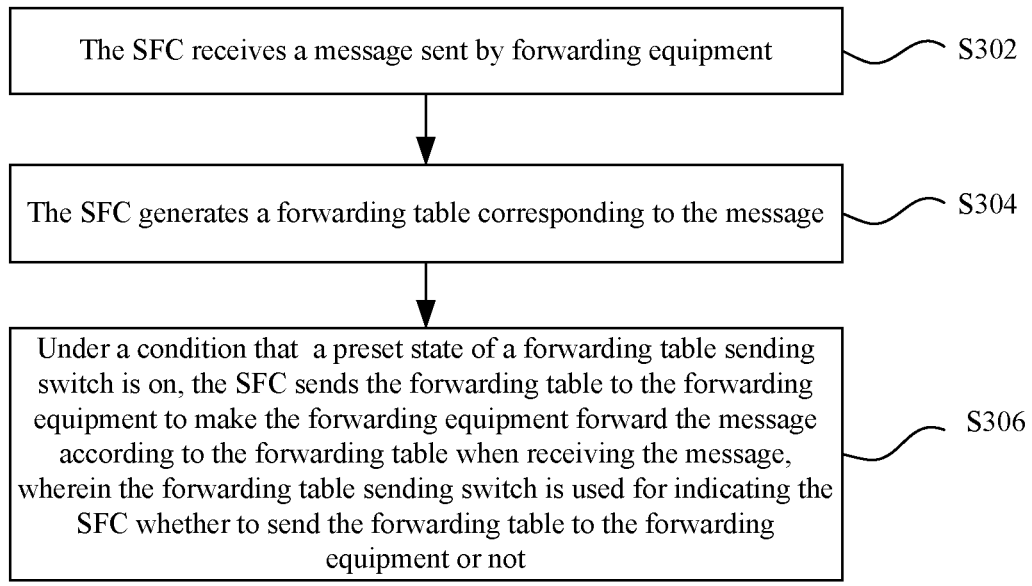
FIG. 3 is a flowchart of a method for processing an SFC according to a first embodiment of the disclosure.

In a first embodiment of the disclosure, a method for processing an SFC is provided. FIG. 3 is a flowchart of a method for processing an SFC according to a first embodiment of the disclosure, and as shown in FIG. 3, the method mainly includes the following steps (Step 302 to Step 306):

Step 302: the SFC receives a message sent from forwarding equipment;

Step 304: the SFC generates a forwarding table corresponding to the message; and Step 306: under a condition that a preset state of a forwarding table sending switch is on, the SFC sends the forwarding table to the forwarding equipment to make the forwarding equipment forward the message according to the forwarding table when receiving the message, wherein the forwarding table sending switch is used for indicating the SFC whether to send the forwarding table to the forwarding equipment or not.

By each of the abovementioned steps, an operator may deploy the SFC and adopt a manner of switching on a switch "forwarding through forwarding equipment" to make it possible for a conventional router to receive the forwarding table sent from the SFC without replacing the conventional router with novel forwarding equipment, thereby flexibly upgrading a network formed by the conventional router into an SFC network.

In a first embodiment, a message forwarding manner corresponding to the forwarding table sending switch may include: forwarding through the forwarding equipment, wherein forwarding through the forwarding equipment refers to that the SFC sends the forwarding table to the forwarding equipment after generating the forwarding table, the forwarding equipment searches for whether there is a forwarding table corresponding to the message or not when the message entering the forwarding equipment, the forwarding equipment forwards the message according to the searched forwarding table when there is the searched forwarding table corresponding to the message, and when there is not the searched forwarding table corresponding to the message, the forwarding equipment sends the message to the SFC, and the SFC creates the forwarding table for the message and sends the created forwarding table to the forwarding equipment.

In the first embodiment, the message forwarding manner corresponding to the forwarding table sending switch may further include: forwarding through the SFC, wherein forwarding through the SFC refers to that the SFC does not send the forwarding table to the forwarding equipment after generating the forwarding table, the forwarding equipment sends the message to the SFC when the message enters the forwarding equipment, and the SFC creates the forwarding table for the message and forwards the message according to the created forwarding table.

During a practical application, an application scenario of the method for processing the SFC provided by the first embodiment may include: SF-based NAT, a DHCP and IPsec.

Figure 4:
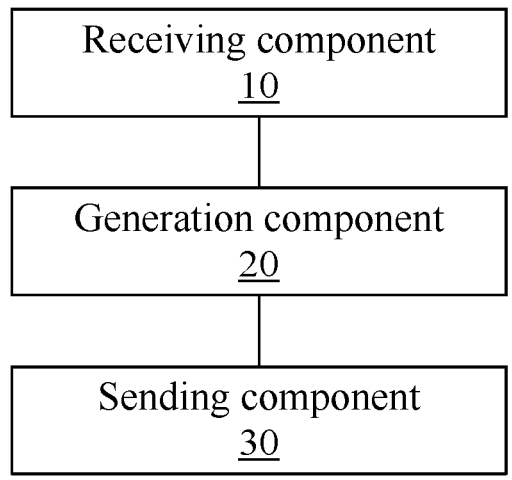
FIG. 4 is a structural block diagram of a device for processing an SFC according to a first embodiment of the disclosure.

In the first embodiment of the disclosure, a device for processing an SFC, which is configured to implement the method for processing the SFC provided by the first embodiment, is further provided. FIG. 4 is a structural block diagram of a device for processing an SFC according to a first embodiment of the disclosure, and as shown in FIG. 4, the device includes: a receiving component 10, a generation component 20 and a sending component 30, wherein the receiving component 10 is configured to receive a message sent from forwarding equipment; the generation component 20 is configured to generate a forwarding table corresponding to the message; and the sending component 30 is configured to, under a condition that a preset state of a forwarding table sending switch is on, send the forwarding table to the forwarding equipment to make the forwarding equipment forward the message according to the forwarding table when receiving the message, wherein the forwarding table sending switch is used for indicating the SFC whether to send the forwarding table to the forwarding equipment or not.

In the first embodiment, information used for generating the forwarding table may include one of: a routing table, a NAT mapping entry and an openflow table.

Figure 5:
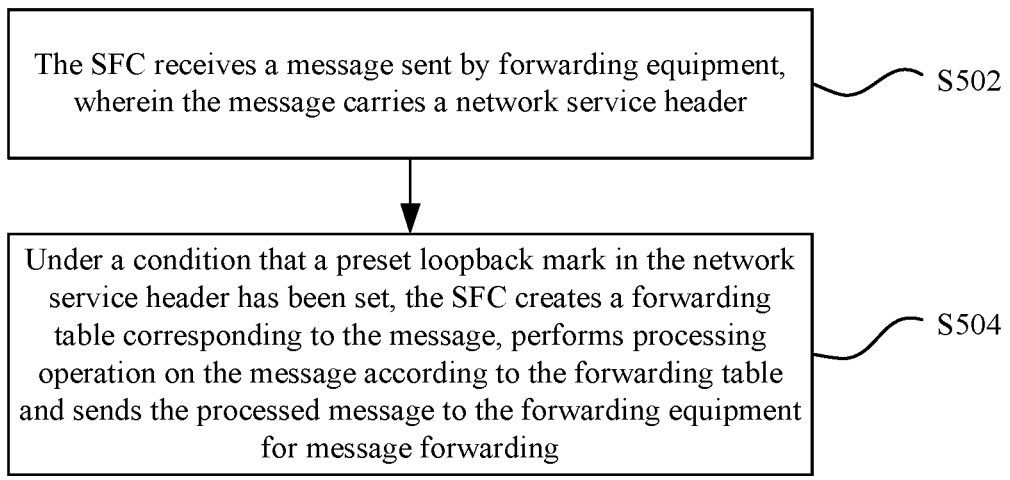
FIG. 5 is a flowchart of a method for processing an SFC according to a second embodiment of the disclosure.

In a second embodiment of the disclosure, another method for processing an SFC is provided. FIG. 5 is a flowchart of a method for processing an SFC according to a second embodiment of the disclosure, and as shown in FIG. 5, the method mainly includes the following steps (Step 502 to Step 504):

Step 502: SFC receives a message sent from forwarding equipment, wherein the message carries a network service header; and Step 504: under a condition that a preset loopback mark in the network service header has been set, the SFC creates a forwarding table corresponding to the message, performs processing operation on the message according to the forwarding table and sends the processed message to the forwarding equipment for message forwarding.

By each of the abovementioned steps, an operator may switch on a loopback switch and set the switch in the service header of the message to enable an SFC component to send the message back to a source router and perform forwarding operation by virtue of a routing table in the source router after processing the message, thereby simply and conveniently upgrading a network formed by a conventional router into an SFC network.

During a practical application, an application scenario of the method for processing the SFC provided by the second embodiment may include: SF-based NAT, a DHCP and IPsec.

Figure 6:
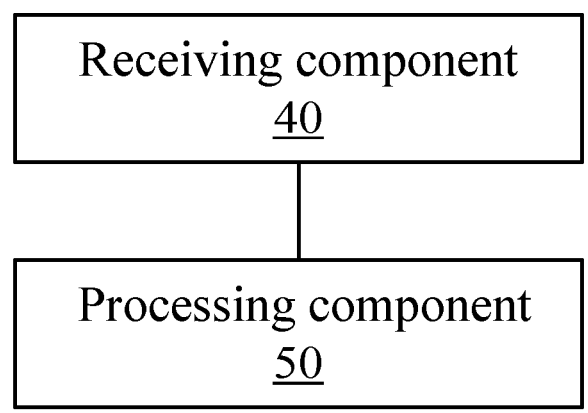
FIG. 6 is a structural block diagram of a device for processing an SFC according to a second embodiment of the disclosure.

In the second embodiment of the disclosure, a device for processing an SFC, which is configured to implement the method for processing the SFC provided by the second embodiment, is further provided. FIG. 6 is a structural block diagram of a device for processing an SFC according to a second embodiment of the disclosure, and as shown in FIG. 6, the device includes: a receiving component 40 and a processing component 50, wherein the receiving component 40 is configured to receive a message sent from forwarding equipment, wherein the message carries a network service header; and the processing component 50 is configured for SFC to, under a condition that a preset loopback mark in the network service header has been set, create a forwarding table corresponding to the message, perform processing operation on the message according to the forwarding table and send the processed message to the forwarding equipment for message forwarding.

In the second embodiment, the processing operation may include at least one of: encapsulation/decapsulation and message field processing.

According to the method for processing the SFC provided by the first embodiment or the second embodiment, a manner of additionally setting the forwarding table sending switch or the loopback mark is adopted, so that the problem that the SFC may not successfully forward data in a specific scenario is solved, a success rate of data forwarding of the SFC is increased, and data forwarding performance of network equipment is improved.

The methods for processing the SFC provided by the first embodiment and the second embodiment will be further described and introduced below with reference to FIG. 7 to FIG. 12, a first example embodiment and a second example embodiment.

Figure 7:
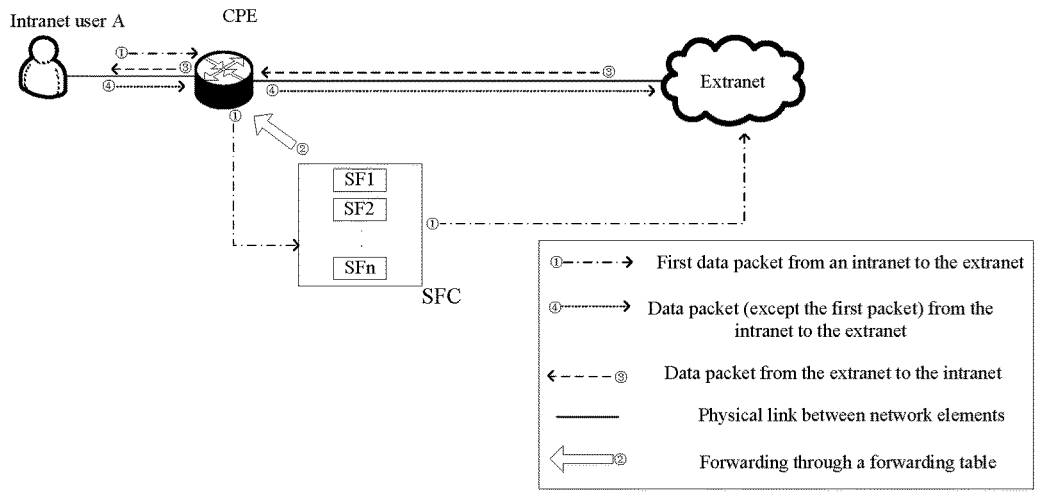
FIG. 7 is a diagram of an application scenario with an additional forwarding table sending switch according to a first example embodiment of the disclosure.

FIG. 7 is a diagram of an application scenario with an additional forwarding table sending switch according to a first example embodiment of the disclosure, and in such an application scenario, the first example embodiment may be implemented in a manner as follows:

an SFC node generates a forwarding table entry (i.e. the abovementioned forwarding table) according to a received message, and decides whether to send the forwarding table entry to forwarding equipment or not according to a forwarding table sending switch, wherein the forwarding table entry is a table generated to forward the message according to message field information and some configuration information, such as a routing table of a conventional router, a NAT mapping entry and an openflow table.

In an example embodiment, the forwarding table sending switch refers to one of forwarding through the forwarding equipment and forwarding through the SFC.

Forwarding through the forwarding equipment refers to that the SFC node creates and sends the forwarding table entry to the forwarding equipment, the forwarding equipment searches for the forwarding table after the message entering the forwarding equipment, the forwarding equipment forwards the message when the corresponding table entry is found, and when the corresponding table entry is not found, the forwarding equipment sends the message to a service classification component for processing and sends the message to the SFC node for processing, and the SFC node creates the forwarding table entry and sends the created forwarding table entry to the forwarding equipment.

Forwarding through the SFC refers to that the SFC node does not send the forwarding table entry to the forwarding equipment after generating the forwarding table entry, the forwarding equipment sends the message to the service classification component for processing without table searching after receiving the message, and sends the message to the SFC node for processing, and the SFC node creates the forwarding table entry and forwards the message.

During a practical application, the forwarding table sending switch may be configured by a user, and an on/off state of the SFC is notified.

Figure 8A:
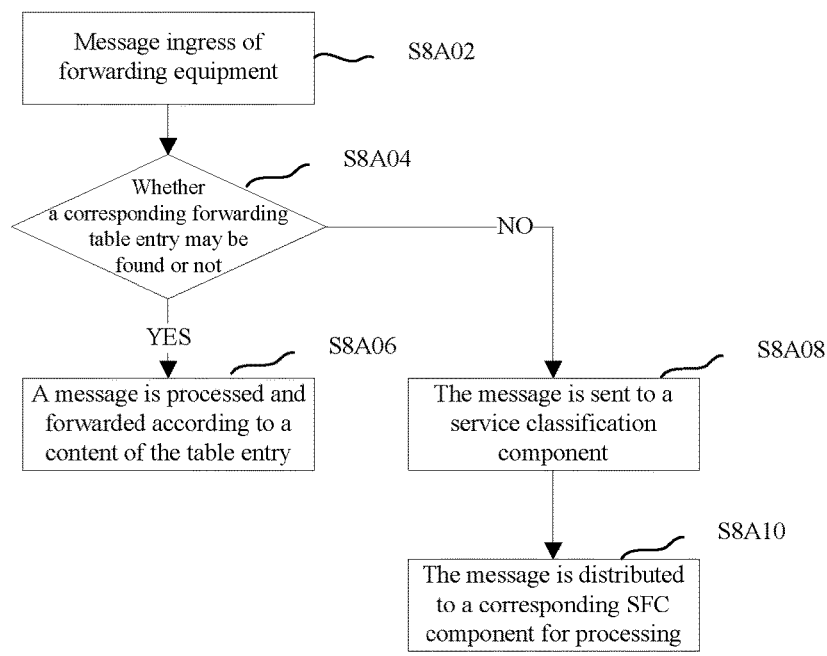
FIG. 8A is a flowchart of message processing on forwarding equipment according to a first example embodiment of the disclosure.

FIG. 8A is a flowchart of message processing on forwarding equipment according to preferred embodiment 1 of the disclosure, and as shown in FIG. 8A, the flow includes the following steps:

Step 8A02: a message enters a message ingress of forwarding equipment;

Step 8A04: the forwarding equipment judges whether a corresponding forwarding table entry may be found or not, Step 8A06 is executed when the corresponding forwarding table entry may be found, otherwise Step 8A08 is executed;

Step 8A06: the forwarding equipment processes and forwards the message according to a content of a table entry;

Step 8A08: the forwarding equipment sends the message to a service classification component; and Step 8A10: the service classification component distributes the message to a corresponding SFC component for processing.

Figure 8B:
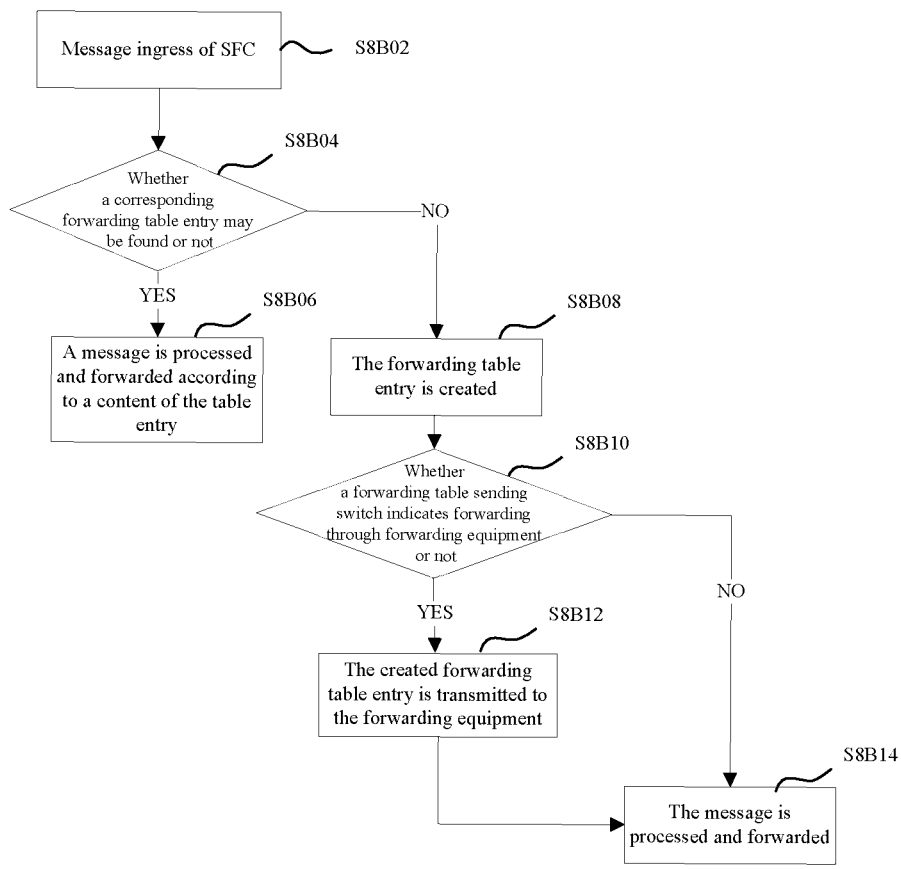
FIG. 8B is a flowchart of message processing on SFC according to a first example embodiment of the disclosure.

FIG. 8B is a flowchart of message processing on SFC according to a first example embodiment of the disclosure, and as shown in FIG. 8B, the flow includes the following steps:

Step 8B02: a message enters a message ingress of SFC;

Step 8B04: the SFN judges whether a corresponding forwarding table entry may be found or not, Step 8B06 is executed when the corresponding forwarding table entry may be found, otherwise Step 8B08 is executed;

Step 8B06: the SFC processes and forwards the message according to a content of a table entry;

Step 8B08: the SFN creates the forwarding table entry for the message;

Step 8B10: the SFC judges whether a message forwarding manner corresponding to a forwarding table sending switch is forwarding through forwarding equipment or not, Step 8B12 is executed when the forwarding table sending switch is the forwarding through forwarding equipment, otherwise Step 8B14 is executed;

Step 8B12: the SFC sends the created forwarding table entry to the forwarding equipment, and Step 8B14 is executed; and Step 8B14: the SFC processes and forwards the message.

A First Example Embodiment

Figure 9:
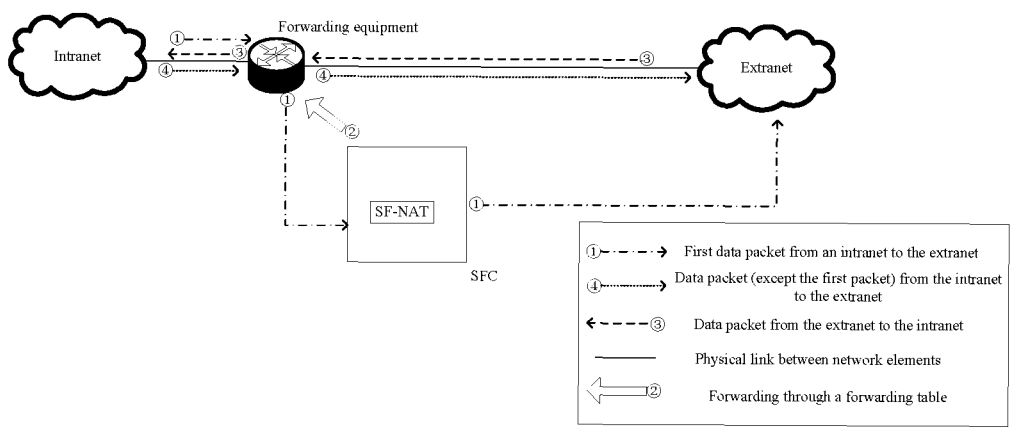
FIG. 9 is a schematic diagram of message interaction and forwarding table sending according to a first example embodiment of the disclosure.

FIG. 9 is a diagram of message interaction and forwarding table sending according to a first example embodiment of the disclosure, and referring to FIG. 9, the flow may include the following steps.

Step 902: a user configures a forwarding table sending switch to be forwarding through forwarding equipment.

An outbound traffic processing (i.e. processing over data traffic transmitted from an intranet to an extranet) flow specifically includes the following steps:

Step 904: an intranet terminal sends an Internet access message, which arrives at the forwarding equipment as shown in FIG. 9 after passing through a series of network equipment;

Step 906: the forwarding equipment (router) receives the message, searches for a forwarding table, and sends the message to a service classification component when no corresponding forwarding table entry is found, and the message is processed and sent to an SFC node by the component;

Step 908: the SFC node searches for the forwarding table according to the received message, and does not find any related forwarding table entry;

Step 9010: the SFC node continues performing NAT processing on the message, and the SFC node selects an Internet Protocol (IP) address of a public network address pool and a port as an IP address and port obtained by NAT to be combined with a source IP address, source port number and protocol type in the message to generate the forwarding table entry;

Step 9012: the SFC node performs network address and port translation on the message according to the generated forwarding table entry, and sends the message to the next hop; and Step 9014: the SFC node determines that the forwarding table sending switch is set to be forwarding through the forwarding equipment, and then sends the generated forwarding table entry to the forwarding equipment.

An inbound traffic processing (i.e. processing over data traffic transmitted from the extranet to the intranet) flow specifically includes:

Step 9016: when subsequent traffic enters the forwarding equipment, the forwarding equipment searches for a forwarding table and finds a related table entry, and the forwarding equipment directly performs operation of address translation and the like on the message and sends the message to the next hop;

Step 9018: an extranet side sends a message to the forwarding equipment, the forwarding equipment searches for a related forwarding table;

Step 9020: when the related forwarding table entry is found, network address and port translation is performed on the message, and the message is sent to the next hop until reaching the intranet; and Step 9022: when no related forwarding table entry is found, the message is discarded (or other processing is performed according to a specific configuration).

Figure 10:
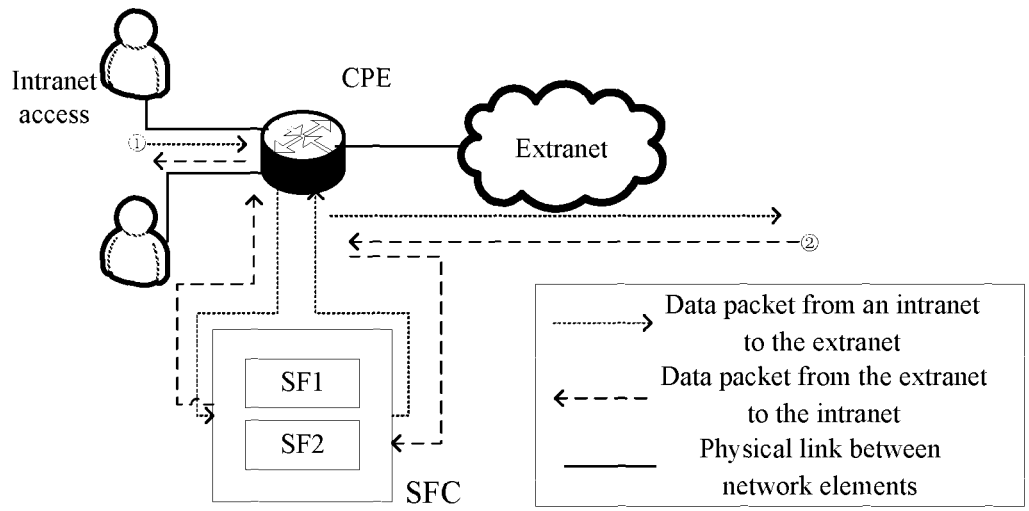
FIG. 10 is a diagram of an application scenario with an additional loopback mark according to a second example embodiment of the disclosure.

FIG. 10 is a diagram of an application scenario with an additional loopback mark according to a second example embodiment of the disclosure, and in such an application scenario, the second embodiment may be implemented in a manner as follows.

Dataplane metadata allows each edge service processing node to exchange information with one another to achieve a certain service processing purpose, and is a data field defined by an existing SFC framework. In the related art, there is no related loopback mark (a loopback mark is a flag bit) added in a network service header (part of the metadata).

Figure 11:
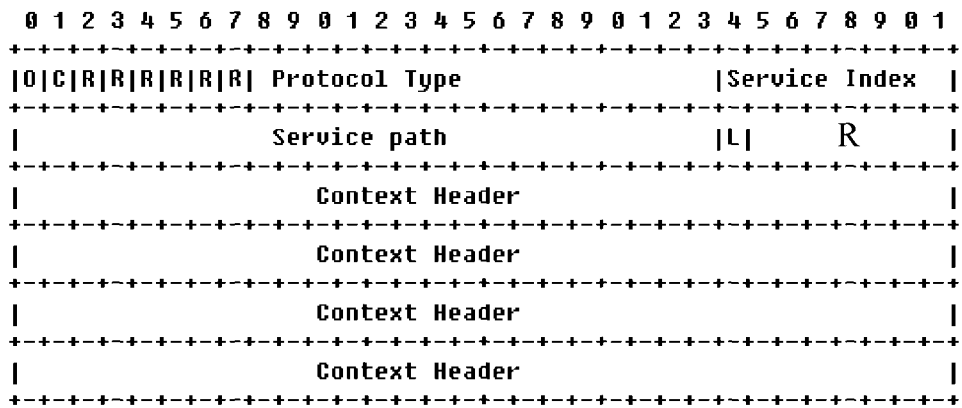
FIG. 11 is a schematic diagram of a position of a loopback mark in a network service header according to a second example embodiment of the disclosure.

FIG. 11 is a diagram of a position of a loopback mark in a network service header according to a second example embodiment of the disclosure, and referring to FIG. 11, when a message is sent to an SFC node from forwarding equipment 1, a flag bit is encapsulated in a network service header for sending to the SFC node together. When the loopback mark in the network service header is set, the SFC node performs corresponding processing to a data packet to obtain a new message, and then sends the message to forwarding equipment 1 for further forwarding.

Under a condition that the flag bit is set, the SFC node loses a function of forwarding the message to the next hop, may only execute modification of encapsulation, decapsulation and the like on the message, and is required to send the message back to the original forwarding equipment for forwarding after finishing processing. When the flag bit is not set, the SFC node has the function of forwarding the message to the next hop, that is, the SFC node forwards the data message after performing modification of encapsulation, decapsulation and the like on the data message.

In an example embodiment, the loopback mark may be set by configuring the SFC node by a user.

A Second Example Embodiment

Figure 12:
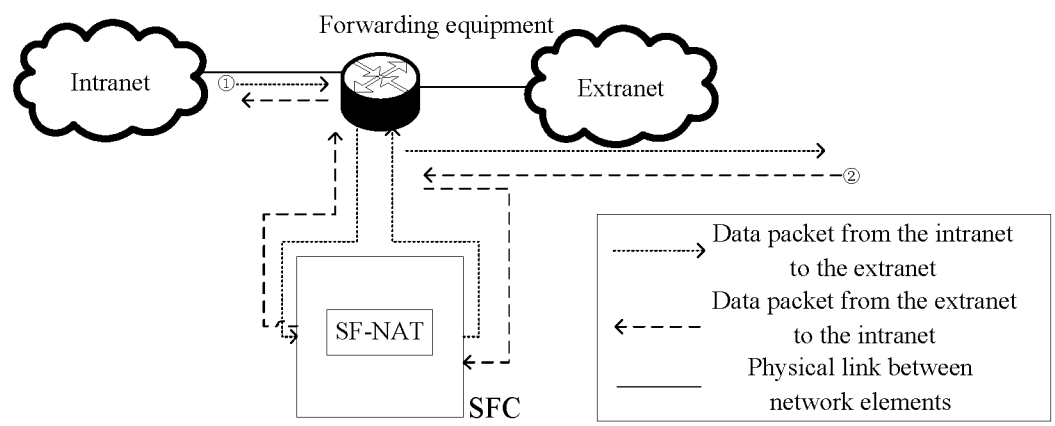
FIG. 12 is a schematic diagram of message interaction according to a second example embodiment of the disclosure.

FIG. 12 is a diagram of message interaction according to a second example embodiment of the disclosure, and referring to FIG. 12, the flow may include the following steps.

Step 1202: a user configures a loopback mark to be on.

An outbound traffic processing (i.e. processing over data traffic transmitted from an intranet to an extranet) flow specifically includes:

Step 1204: an intranet terminal sends an Internet access message, which arrives at forwarding equipment as shown in FIG. 12 after passing through a series of network equipment;

Step 1206: the router receives the message, and sends the message to a service classification component, the message is processed by the component, a loopback mark in a network service header of metadata is set, and the message is sent to an SFC node;

Step 1208: the SFC node searches for a forwarding table according to the received message, and does not find any related forwarding table entry;

Step 1210: the SFC node continues performing NAT processing on the message, and the SFC node selects an IP address of a public network address pool and a port as an IP address and port obtained by NAT to be combined with a source IP address, source port number and protocol type in the message to generate a forwarding table entry;

Step 1212: the SFC node performs network address and port translation on the message according to the generated forwarding table entry; and Step 1214: the SFC node determines that the loopback mark is set, and then forwards the message to the forwarding equipment, and the forwarding equipment forwards the message to the next hop.

A method the same as an outbound traffic processing method is adopted for an inbound traffic processing (i.e. processing over data traffic transmitted from the extranet to the intranet) flow.

It needs to be noted that each of the abovementioned components may be implemented through hardware. For example: a processor includes each of the abovementioned components, or, each of the abovementioned components is positioned in a processor respectively.

In another embodiment, software is further provided, which is configured to execute the technical solutions described in the abovementioned embodiments and preferred implementation modes.

In another embodiment, a storage medium is further provided, in which the abovementioned software is stored, the storage medium including, but not limited to: a compact disc, a floppy disk, a hard disk, an erasable memory and the like.

From the above descriptions, it can be seen that the disclosure has technical effects as follows:

since a conventional router supports forwards a data message on a basis of a forwarding table such as a routing table and a NAT table, by the method provided by the first (example) embodiment, the operator may deploy the SFC and adopt the manner of switching on the switch "forwarding through forwarding equipment" to make it possible for the conventional router to receive the forwarding table transmitted by the SFC and further flexibly upgrade the network formed by the conventional router into the SFC network without replacing the conventional router with novel forwarding equipment to reduce the cost of the operating company.

Similarly, the SFC is deployed in the network formed by the conventional router, and by the method provided by the second (example) embodiment, the operator may switch on a loopback switch and set the switch in a service header of a message, and the SFC component may send the message back to the source router and perform forwarding operation by virtue of the routing table in the source router after finishing processing the message, thereby simply and conveniently upgrading the network formed by the conventional router into the SFC network.

Obviously, those skilled in the art should know that each component of each component or step of the disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the disclosure is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

INDUSTRIAL APPLICABILITY

As mentioned above, the method and device for processing the SFC provided by the embodiments of the disclosure have beneficial effects as follows: the operator may deploy the SFC and adopt the manner of switching on the switch "forwarding through forwarding equipment" to make it possible for the conventional router to receive the forwarding table transmitted by the SFC and further flexibly upgrade the network formed by the conventional router into the SFC network without replacing the conventional router with novel forwarding equipment, thereby reducing the cost of the operator; and in addition, the operator may further switch on the loopback switch and set the switch in the service header of the message, and the SFC component may send the message back to the source router and perform forwarding operation by virtue of the routing table in the source router after finishing processing the message, thereby simply and conveniently upgrading the network formed by the conventional router into the SFC network.

What is claimed is:

1. A method for processing a Service Function Chaining (SFC), comprising:
    receiving, by the SFC, a message sent from forwarding equipment;
    generating, by the SFC, a forwarding table corresponding to the message; and
    under a condition that a preset state of a forwarding table sending switch is on, sending, by the SFC, the forwarding table to the forwarding equipment to make the forwarding equipment forward the message according to the forwarding table when receiving the message, wherein the forwarding table sending switch is used for indicating the SFC whether to send the forwarding table to the forwarding equipment or not.

2. The method as claimed in claim 1, wherein a message forwarding manner corresponding to the forwarding table sending switch comprises: forwarding through the forwarding equipment, wherein
    forwarding through the forwarding equipment refers to that the SFC sends the forwarding table to the forwarding equipment after generating the forwarding table, the forwarding equipment searches for whether there is a forwarding table corresponding to the message or not when the message entering the forwarding equipment, the forwarding equipment forwards the message according to the searched forwarding table when there is the searched forwarding table corresponding to the message, and when there is not the searched forwarding table corresponding to the message, the forwarding equipment sends the message to the SFC, and the SFC creates the forwarding table for the message and sends the created forwarding table to the forwarding equipment.

3. The method as claimed in claim 1, wherein a message forwarding manner corresponding to the forwarding table sending switch comprises: forwarding through the SFC, wherein
    forwarding through the SFC refers to that the SFC does not send the forwarding table to the forwarding equipment after generating the forwarding table, the forwarding equipment sends the message to the SFC when the message enters the forwarding equipment, and the SFC creates the forwarding table for the message and forwards the message according to the created forwarding table.

4. The method as claimed in claim 1, wherein information used for generating the forwarding table comprises one of: a routing table, a Network Address Translation (NAT) mapping entry and an openflow table.

5. The method as claimed in claim 1, wherein an application scenario of the method comprises: Service Function (SF)-based NAT, a Dynamic Host Configuration Protocol (DHCP) and Internet Protocol Security (IPsec).

6. A device for processing a Service Function Chaining (SFC), comprising:
    a receiving component, configured to receive a message sent from forwarding equipment;
    a generation component, configured to generate a forwarding table corresponding to the message; and
    a sending component, configured to, under a condition that a preset state of a forwarding table sending switch is on, send the forwarding table to the forwarding equipment to make the forwarding equipment forward the message according to the forwarding table when receiving the message, wherein the forwarding table sending switch is used for indicating the SFC whether to send the forwarding table to the forwarding equipment or not.

7. The device as claimed in claim 6, wherein information used for generating the forwarding table comprises one of: a routing table, a Network Address Translation (NAT) mapping entry and an openflow table.

8. A method for processing a Service Function Chaining (SFC), comprising:
    receiving, by SFC, a message sent from forwarding equipment, wherein the message carries a network service header; and
    under a condition that a preset loopback mark in the network service header has been set, creating, by the SFC, a forwarding table corresponding to the message, performing, by the SFC, processing operation on the message according to the forwarding table and sending, by the SFC, the processed message to the forwarding equipment for message forwarding.

9. The method as claimed in claim 8, wherein the processing operation comprises at least one of: encapsulation/decapsulation and message field processing.

10. The method as claimed in claim 8, wherein an application scenario of the method comprises: Service Function (SF)-based Network Address Translation (NAT), a Dynamic Host Configuration Protocol (DHCP) and Internet Protocol Security (IPsec).

11. A device for processing a Service Function Chaining (SFC), comprising:
    a receiving component, configured to receive a message sent from forwarding equipment, wherein the message carries a network service header; and
    a processing component, configured for SFC to, under a condition that a preset loopback mark in the network service header has been set, create a forwarding table corresponding to the message, perform processing operation on the message according to the forwarding table and send the processed message to the forwarding equipment for message forwarding.

12. The device as claimed in claim 11, wherein processing operation comprises at least one of: encapsulation/decapsulation and message field processing.

13. The method as claimed in claim 2, wherein information used for generating the forwarding table comprises one of: a routing table, a Network Address Translation (NAT) mapping entry and an openflow table.

14. The method as claimed in claim 3, wherein information used for generating the forwarding table comprises one of: a routing table, a Network Address Translation (NAT) mapping entry and an openflow table.

15. The method as claimed in claim 2, wherein an application scenario of the method comprises: Service Function (SF)-based NAT, a Dynamic Host Configuration Protocol (DHCP) and Internet Protocol Security (IPsec).

16. The method as claimed in claim 3, wherein an application scenario of the method comprises: Service Function (SF)-based NAT, a Dynamic Host Configuration Protocol (DHCP) and Internet Protocol Security (IPsec).

17. The method as claimed in claim 9, wherein an application scenario of the method comprises: Service Function (SF)-based Network Address Translation (NAT), a Dynamic Host Configuration Protocol (DHCP) and Internet Protocol Security (IPsec).

* * * * *